Sept. 24, 1963
C. H. McKINNEY
3,104,605
SKEWER HOLDER
Filed Oct. 6, 1960
Fig. 1.
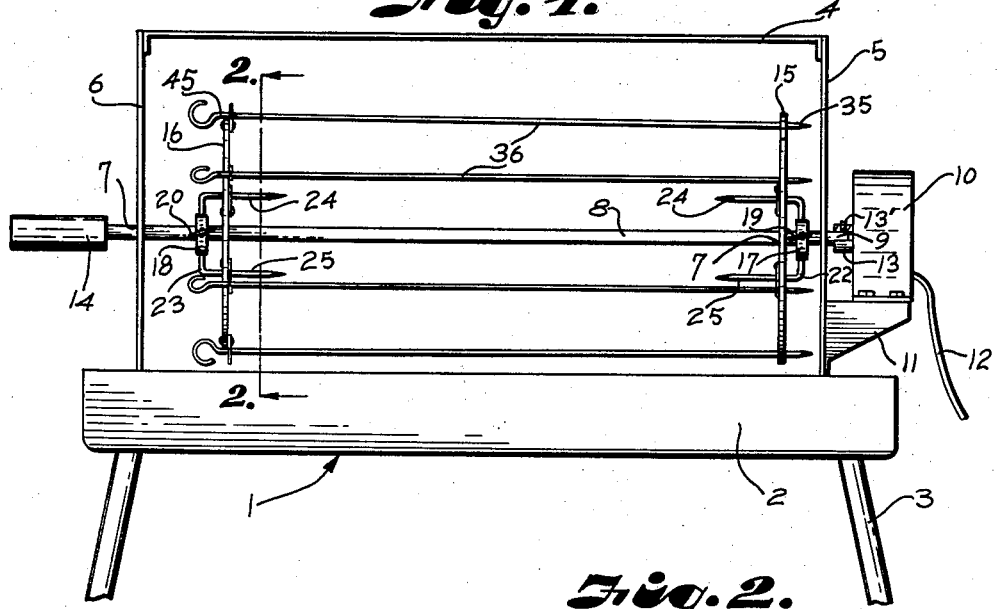
Fig. 2.
Fig. 3.
Fig. 4.
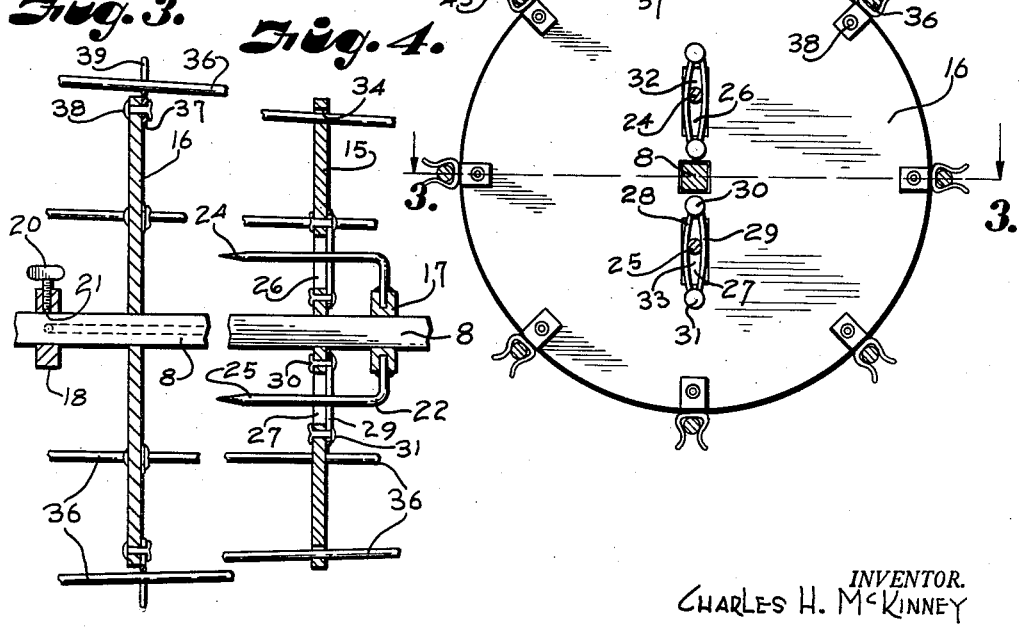
INVENTOR.
CHARLES H. McKINNEY
BY
Fishburn & Gold
ATTORNEYS

United States Patent Office 3,104,605
Patented Sept. 24, 1963

3,104,605
SKEWER HOLDER
Charles H. McKinney, 2404 Kentucky, Topeka, Kans.
Filed Oct. 6, 1960, Ser. No. 60,844
1 Claim. (Cl. 99—421)

This invention relates to a new and useful spit and skewer holder for rotisseries or the like and more particularly to apparatus for removably mounting the skewers on the rotating disks or plates carried by the shaft of such rotisseries.

Heretofore, in rotisseries of this character, the means for securing the skewers or spits to the rotisserie have been cumbersome and required time to mount and demount the same thereon. Most skewers have to be fastened by screw means or extended through opening in the disks or plates on the rotatable shaft and then the meat or other edibles placed thereon before being mounted over the fire or the rotisserie proper.

It is the principal object of the present invention to provide apparatus for mounting skewers in a rotisserie whereby one end may be inserted through openings in one of the disks on the shaft and the other end engaged in keeper means spaced about the other disk or plate on said shaft.

Other objects of the present invention are to provide a rotatable shaft in the rotisserie or firebox upon which are mounted spaced disks, one of said disks being slightly larger in diameter than the other, and the larger disk having spaced openings near the periphery of the disk to receive the pointed end of a plurality of skewers, and to provide resilient means on the periphery of the other disk for receiving and retaining the other end of the skewers without inserting the skewers through said disk.

Still further objects of the present invention are to provide resilient keeper means on each of said disks spaced from said shaft of the rotisserie whereby the forks on the clamping means may be inserted in said resilient means for retaining the forks for penetrating the meat or fowl or other edibles; to provide means on the disks for receiving and retaining the forks of the clamping members of different size and retaining the same in spaced relation to said shaft, and to provide a device of this character simple and economical to manufacture.

Other objects and advantages of this invention will become apparent from the following description taken in connection with the accompanying drawings wherein are set forth by way of illustration and example certain embodiments of this invention.

FIG. 1 is a side view of my invention showing the same mounted on a firebox or rotisserie.

FIG. 2 is a cross sectional view taken on a line 2—2, FIG. 1.

FIG. 3 is an enlarged cross sectional fragmentary view of one of the disks illustrating the clamp means.

FIG. 4 is an enlarged cross sectional fragmentary view particularly illustrating the resilient keeper means on the disks for retaining the meat holding forks therein.

Referring more in detail to the drawings:

1 designates a rotisserie or cooking device having a firebox 2 mounted on legs 3 and having a housing or cover 4. The sides 5 and 6 of the housing have aligned openings 7 for receiving a shaft 8 having its ends extending through the housing and mounted upon the side 5 is a motor 10 for rotating the shaft 8. The motor is mounted on a bracket 11 secured to the housing and here shown to be an electric motor operated from a source of supply (not shown) through cord 12. The shaft 8 may be round although I have here illustrated it in FIG. 2 to be substantially square. The end 9 of the shaft 8 has a connection with a collar 13 connected with the shaft of the motor 10. The shaft 8 is removable from the connection and from the housing merely by loosening the set screw 13' and removing the shaft by the handle 14 to the left in FIG. 1 through the openings 7.

Slidably and adjustably mounted on the shaft 8 are spaced disks or plates 15 and 16. The disks are adjustable toward and away from each other and held in place by clamping members 17 and 18 having thumb screws 19 and 20 having their inner points engaging the shaft as indicated at 21, FIG. 3. The clamping members 17 and 18 are provided with U-shaped members 22 and 23 providing spaced prongs 24 and 25 which extend through slots 26 and 27 spaced on each side of the shaft 8 as best illustrated in FIG. 2. The prongs are adapted to penetrate into meat or fowl threaded on the shaft 8 as is the usual practice.

Mounted in longitudinal relation to the slots 26 and 27 are spaced resilient wire members 28 and 29 by rivets or the like 30 and 31. As these resilient keeper members are identical only one is described. It will thus be obvious the spaced resilient members 28 and 29 provide elongated spaces 32 and 33 in close relation to the slots 26 and 27 and through which the prongs 24 and 25 will extend. These elongated spaces will provide for the use of prongs or U-shaped members of different sizes and widths and still retain the same in spaced relation to the shaft 8 and provide easy insertion and removal of said prongs.

The disk or plate 15 is provided near its outer edge with a plurality of spaced openings 34 for receiving the pointed ends 35 of a plurality of skewers 36. I have here illustrated the skewers to be eight in number although any number may be used. Mounted on the periphery of the disk 16 are a plurality of spaced plates 37 by rivets or the like 38. Secured to the plates 37 are U-shaped keeper members 39 forming spaced arms 40 and 41 having their outer edges turned outwardly from each other as indicated at 42 and 43, FIG. 2, forming a narrow portion or throat 44 therebetween for retaining said skewers therein.

The openings 34 in the disk 15 are for receiving the ends 35 of the skewers and the opposite ends 45 are adapted to engage in the keepers 39 as illustrated in FIG. 2.

In operation of a device constructed and assembled as described, the shaft 8 is disassembled from the housing and from the clamping members 17 and 18 and the disk 16 placed upon the shaft. The meat or fowl is then threaded upon the shaft 8 and the disk 15 then mounted on the shaft and the clamping member 17 secured thereon and the disks adjusted with relation to each other and the thumb nut secured to the adjusted position to hold the meat between the disks at the desired relation. The shaft is then placed through the opening in the housing and connected to the collar 13 of the motor for rotation therewith.

The collar 13 on the end 9 of the shaft is a substantially square opening corresponding to the shaft and is secured to the shaft of the motor so that when the motor operates the shaft will rotate therewith. The items of foodstuffs to be cooked on the several spits or skewers 36 are then impaled upon the skewers and the pointed ends inserted through the openings 34 in the disk 15. Then merely by pressure on the handle ends 45 of the skewers, they may be inserted through the throat 44 of the keepers 39 so that they will be retained therein and yet be easily removable therefrom.

It will be noted the disk 15 is slightly larger than the disk 16 so that the skewers 36 will be in parallel relation with the firebox 2.

It will be obvious that the skewer arrangement may be utilized for use in the firebox as shown or it may be used in an electric oven or rotisserie without departing from the spirit of my invention.

It will further be obvious that I have provided an improved skewer holder arrangement and means for quickly securing the skewers to the spaced disk and removing the same therefrom in a manner not heretofore known.

It is to be understood that while I have illustrated and described one form of my invention, it is not to be limited to the specific form or arrangement of parts herein described and shown except insofar as such limitations are included in the claim.

What I claim and desire to secure by Letters Patent is:

A food holding spit for broilers and the like comprising, a shaft on which food is impaled, means rotatably supporting said shaft, a pair of disks freely slidable on said shaft, a plurality of skewers on which food is impaled, means on said disks for removably securing said skewers about the periphery thereof, means adapted to adjustably secure said disks on said shaft in spaced relation, said latter means having a shaft gripping member and spaced prongs for engaging food impaled on said shaft between said disks, said disks each having a slot located on each side of said shaft through which said prongs extend, and means on said disks for engaging said prongs, said last named means comprising spaced resilient wire members extending over said slots, whereby said disks are retained longitudinally with respect to said shaft.

References Cited in the file of this patent
UNITED STATES PATENTS

| | | |
|---|---|---|
| 1,548,510 | Clay | Aug. 4, 1925 |
| 1,786,300 | Harrison | Dec. 23, 1930 |
| 2,649,852 | McCandless | Aug. 25, 1953 |
| 2,705,450 | Steinbook | Apr. 5, 1955 |
| 2,787,209 | Radar | Apr. 2, 1957 |
| 2,985,096 | Wolske | May 23, 1961 |

FOREIGN PATENTS

| | | |
|---|---|---|
| 838,212 | France | Nov. 28, 1938 |
| 53,888 | France | Aug. 5, 1946 |